United States Patent
Sack et al.

(10) Patent No.: US 6,910,708 B2
(45) Date of Patent: Jun. 28, 2005

(54) ONE HAND PULL COLLAPSIBLE STROLLER

(75) Inventors: James A. Sack, Elverson, PA (US); Glenn E. Gehr, New Holland, PA (US); Gregg R. Espenshade, Bowmansville, PA (US)

(73) Assignee: Wonderland Nurseygoods Co., Ltd.., Taipei (TW)

( * ) Notice: Subject to any disclaimer, the term of this patent is extended or adjusted under 35 U.S.C. 154(b) by 0 days.

(21) Appl. No.: 10/170,403

(22) Filed: Jun. 14, 2002

(65) Prior Publication Data

US 2003/0160432 A1 Aug. 28, 2003

Related U.S. Application Data

(60) Provisional application No. 60/301,253, filed on Jun. 28, 2001, and provisional application No. 60/298,082, filed on Jun. 15, 2001.

(51) Int. Cl.[7] .................................................. B62B 1/00
(52) U.S. Cl. ........................... 280/642; 403/83; 403/85
(58) Field of Search ................................. 280/642, 647, 280/643, 648, 649, 650, 657, 658, 47.38, 47.4, 644; 403/62, 83, 85, 101, 102, 113, 77; 277/184.11, 184.13, 184.17

(56) References Cited

U.S. PATENT DOCUMENTS

| 4,880,331 | A | * | 11/1989 | Zun | 403/24 |
|---|---|---|---|---|---|
| 5,039,118 | A | * | 8/1991 | Huang | 280/47.371 |
| 5,520,474 | A | * | 5/1996 | Liu | 403/97 |
| 5,551,745 | A | * | 9/1996 | Huang | 296/111 |
| 5,765,958 | A | * | 6/1998 | Lan | 403/97 |
| 5,988,012 | A | * | 11/1999 | Arnoth | 74/527 |
| 6,086,284 | A | * | 7/2000 | Callahan | 403/93 |
| 6,170,853 | B1 | * | 1/2001 | Brown et al. | 280/642 |
| 6,322,098 | B1 | * | 11/2001 | Lan | 280/642 |
| 6,629,801 | B2 | * | 10/2003 | Cheng | 403/101 |
| 2002/0171227 | A1 | * | 11/2002 | Eguchi et al. | 280/650 |
| 2004/0113394 | A1 | * | 6/2004 | Cheng | 280/647 |

FOREIGN PATENT DOCUMENTS

| EP | 339890 | * | 11/1989 |
|---|---|---|---|
| EP | 1160145 | * | 12/2001 |
| GB | 2163478 | * | 2/1986 |

* cited by examiner

Primary Examiner—Bryan Fischmann
(74) Attorney, Agent, or Firm—McKenna Long & Aldridge LLP (57) ABSTRACT

A collapsible stroller including a lockable hinge and a seat assembly pivotally mounted on the stroller frame. With the use of a seat strap attached to the seat assembly, the stroller can be collapsed using one hand. Pulling on the seat strap pivots the seat assembly to a position in which engagement surfaces on the seat assembly engage with the hinge latch of the lockable hinge. Engaging the hinge latch with the seat assembly unlocks the lockage hinge allowing the stroller to collapse.

13 Claims, 14 Drawing Sheets

ONE HAND PULL COLLAPSIBLE STROLLER

CROSS REFERENCE TO RELATED APPLICATIONS

This application claims benefit of U.S. Provisional Patent Applications No. 60/301,253 entitled "One Hand Pull Stroller", filed Jun. 28, 2001, and No. 60/298,082 entitled "One Hand Pull Stroller", filed Jun. 15, 2001, which are hereby incorporated by reference.

BACKGROUND OF THE INVENTION

1. Field of the Invention

The present invention relates to a collapsible stroller, and more particularly to a stroller capable of collapsing via a single hand pull, wherein the collapsed stroller maintains an extremely compact size and is capable of remaining in a standing position.

2. Discussion of the Related Art

Infant strollers are available in a variety of shapes and sizes. Although there are many to chose from, in general, full feature strollers are bulky and cumbersome. In today's market virtually every stroller is capable of collapsing for storage or transport. Yet, even when collapsed, strollers remain bulky and cumbersome, making them difficult to manipulate.

A large bulky stroller increases the difficulties associated with the use and manipulation of the stroller. Often, in an effort to remain out of others' way, attempts are made to collapse the stroller and place it out of the way or even store it before attempting to place a child in a vehicle. Collapsing a stroller without setting the child or other items down can be very difficult. Furthermore, if not used with the utmost care, the hinge mechanisms on many strollers can pinch the user or even the child.

Transporting a stroller appears to be a simple proposition; however, this too can be a difficult experience. Full-feature strollers include many additional attachments, such as a child's tray, that protrude even when collapsed. Strollers are generally placed in the trunk of a car or the storage area of a mini-van or SUV for transport. Even for large capacity vehicles a stroller can use significant storage space leaving very little room for other items or child paraphernalia.

In addition, full feature strollers carry significant price tags. Costs are escalated due to design and development expenditures, the machining process necessary to obtain the necessary high tolerances for the proper operation of the various mechanisms, as well as the types of materials that are needed to ensure that these multi-function strollers can endure the riggers of use.

SUMMARY OF THE INVENTION

Accordingly, the present invention is directed to an improved structure for a collapsible stroller providing a one-hand pull folding mechanism.

In one embodiment the collapsible stroller of the present invention comprises a frame assembly, at least one lockable hinge, and a seat assembly. The lockable hinge is interconnected with the stroller frame and capable of a locked and an unlocked position. In the locked position the lockable hinge maintains the stroller frame assembly in a fixed position. In the unlocked position the lockable hinge allows the frame assembly to move between the fixed position and a collapsed position. The seat assembly is pivotally connected to the frame assembly and capable of engaging and unlocking the lockable hinge.

In another embodiment, the collapsible stroller comprises a stroller frame, and at least one lockable hinge. The lockable hinge is interconnected with the stroller frame. When the lockable hinge is locked, it remains in a fixed position. When the lockable hinge is unlocked, it moves about its pivot axis. The lockable hinge includes a multi-part outer shell, a hinge lock disposed within the outer shell for selectively locking the outer shell in a fixed position, and an actuator disposed within the outer shell and interconnected with the hinge lock. Rotation of the actuator moves the hinge lock between locked and unlocked positions.

In a further embodiment of the present invention a lockable hinge capable of pivotal movement about a pivot axis when in an unlocked position, and remaining fixed when in a locked position comprises a multi-part outer shell, a hinge lock disposed within the outer shell for selectively locking the outer shell in a fixed position, and an actuator disposed within the outer shell. The actuator is interconnected with the hinge lock. Rotation of the actuator moves the hinge lock between locked and unlocked positions.

In another embodiment of the present invention a method for collapsing a stroller having a lockable hinge, a seat assembly pivotally mounted on the stroller frame, and a pull strap attached to a seat latch assembly comprises the steps of pulling on the pull strap to unlock the seat latch assembly, pivoting the seat assembly to a raised position with the pull strap, engaging the lockable hinge with the raised seat assembly, unlocking the lockable hinge with the raised seat assembly, and allowing the stroller to fold to a collapsed position.

The present invention provides for a highly functional, durable, and easy to use stroller that is economically advantageous. The present invention also provides a stroller that is easy to manufacture and assemble.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
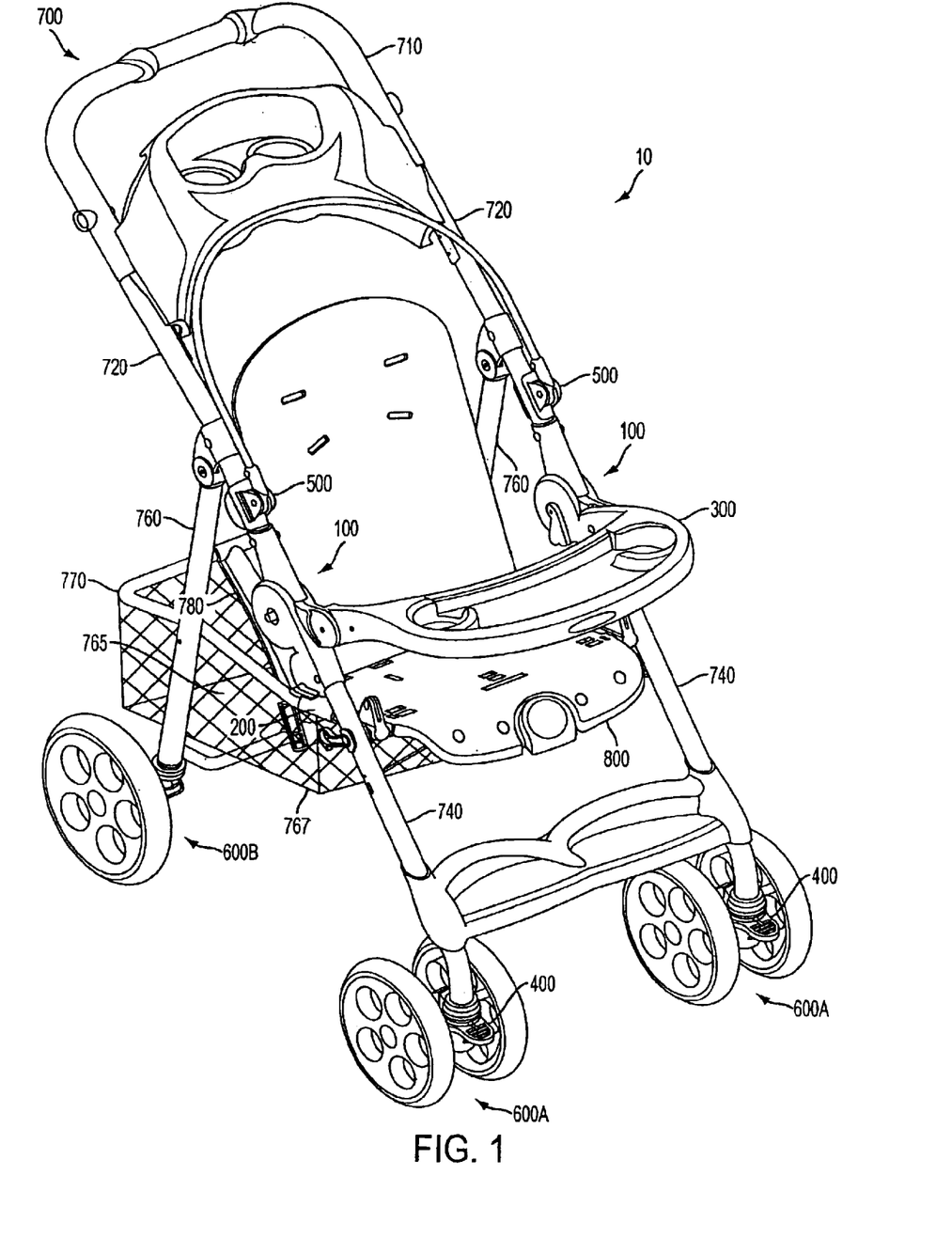
FIG. 1 shows a perspective view of a one-hand pull stroller in accordance with an embodiment of the present invention.

FIG. 1 shows a perspective view of a one-hand pull stroller 10 in accordance with an embodiment of the present invention. As shown, the stroller assembly 10 includes a frame assembly 700, lockable hinges 100, a child's tray 300 that collapses with the stroller, a seat assembly 800, a seat latch assembly 200, multi-part wheel construction of the front wheel assemblies 600A and the rear wheel assemblies 600B, including swivel locks 400 on the front wheel assemblies 600A, and braking components on the rear wheel assemblies 600B, a split board basket base (not shown), and a canopy frame with canopy hinges 500 for locking the canopy in an open or closed position and which may be removed when the canopy is not in use.

The frame assembly 700 of the stroller 10 includes an adjustable handle bar 710, upper frame members 720, lower frame members 740, rear frame members 760, and a basket frame 770. A lockable hinge 100 is used to connect an upper frame member 720 to a lower frame member 740. When the lockable hinge is in a locked state, the upper and lower frame members 720 and 740, as well as the entire frame assembly 700, remain in a substantially fixed position. When the lockable hinge 100 is in an unlocked state, the various parts of the frame assembly 700 are permitted to move relative to one another. Specifically, the upper and lower frame members 720 and 740 are permitted to rotate about the rotation axis of the lockable hinge 100 allowing the stroller 10 to fold into a collapsed position.

In one embodiment, when the stroller is moved to a collapsed position a kickstand extends from the frame assembly 700 allowing the stroller to stand on its end in its collapsed position. A further embodiment provides a frame lock to secure the stroller in the collapsed position.

Returning to FIG. 1, an embodiment of the stroller 10 is shown with a child's tray 300. In this embodiment the child's tray 300 is attached to the lockable hinge 100 and the end of the basket frame 770 with a tray support (not shown). As the lockable hinge 100 is unlocked and the stroller collapses, the child's tray 300 also folds flat systematically with the stroller 10. It can be appreciated that various embodiments of the child's tray could be adjusted or modified as necessary and may vary from that shown.

FIG. 1 also shows the lower frame members 740 connected with the front wheel assemblies 600A. The front wheel assemblies are of multi-part construction and include wheel swivel locks 400 capable of selectively locking the wheel assemblies in a forward facing position. The forward facing position of the wheel assemblies provides a preferred placement of the wheels when folding the stroller and enables the stroller to collapse into a more compact position. It can be appreciated that the swivel locks 400 may be configured to selectively lock the front wheel assembly 600A in any possible position.

Rear frame members 760 pivotally connect to the upper frame member 720 and rear wheel assemblies 600B. The rear wheel assemblies 600B are of multi-part construction and include braking assemblies for locking the rear wheel assemblies to prevent movement of the stroller 10.

The multi-part construction of the wheel assemblies 600A and B allows for specific parts to be constructed of function specific materials. For example, parts needing increased durability may be made from more durable materials. Additionally, bearing parts may also be made from self-lubricating materials. The multi-part construction reduces cost of the construction by allowing only specific parts to be made from more appropriate, and most likely more expensive materials.

In a further embodiment of the present invention, a split-board basket base 765 may be incorporated in a basket 767 attached to the basket frame 770. A split-board split down the median of the board allows the basket base to fold when the stroller 10 is collapsed. Folding the basket base along the median line of the stroller provides additional efficiency in collapsing the stroller 10 by reducing the resistance of the basket base.

A canopy frame with canopy hinges 500 adds an additional convenience to the stroller 10. The canopy hinges 500 secure the canopy frame in an open or closed position.

Figure 2:
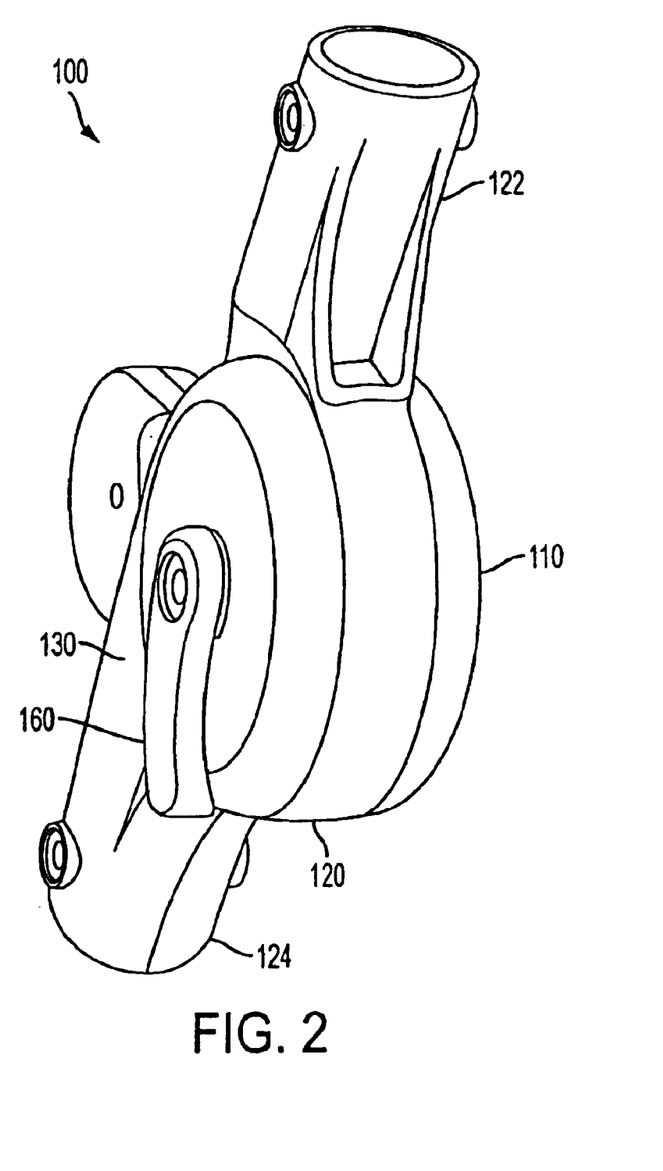
FIG. 2 is an enlarged view of a lockable hinge used to pivotally connect an upper frame member to a lower frame member.

FIG. 2 is a perspective view of the lockable hinge 100. As shown, the lockable binge 100 includes a multiple part outer shell and a hinge hatch 160 located on the medial side of the hinge 100. The outer shell includes a lateral shell section 110, a center shell section 120, and a medial shell section 130. The lateral shell 110 and medial shell 130 also form the lower tube attachment 124 for connection of the lockable hinge to the lower frame member 740 leading to the front wheel assembly 600A. Whereas, the center shell 120 includes an upper tube attachment 122 for connection of the lockable hinge to the upper frame member 720 leading to the handle bar 710. It should be appreciated that the number of shell sections forming the outer shell could be modified or adjusted as needed and may vary from that shown. The hinge latch 160 is in pivotal contact with the medial shell 130. The hinge latch 160 pivots about the pivot axis of the lockable hinge and provides external control of an internal locking assembly.

Figure 3:
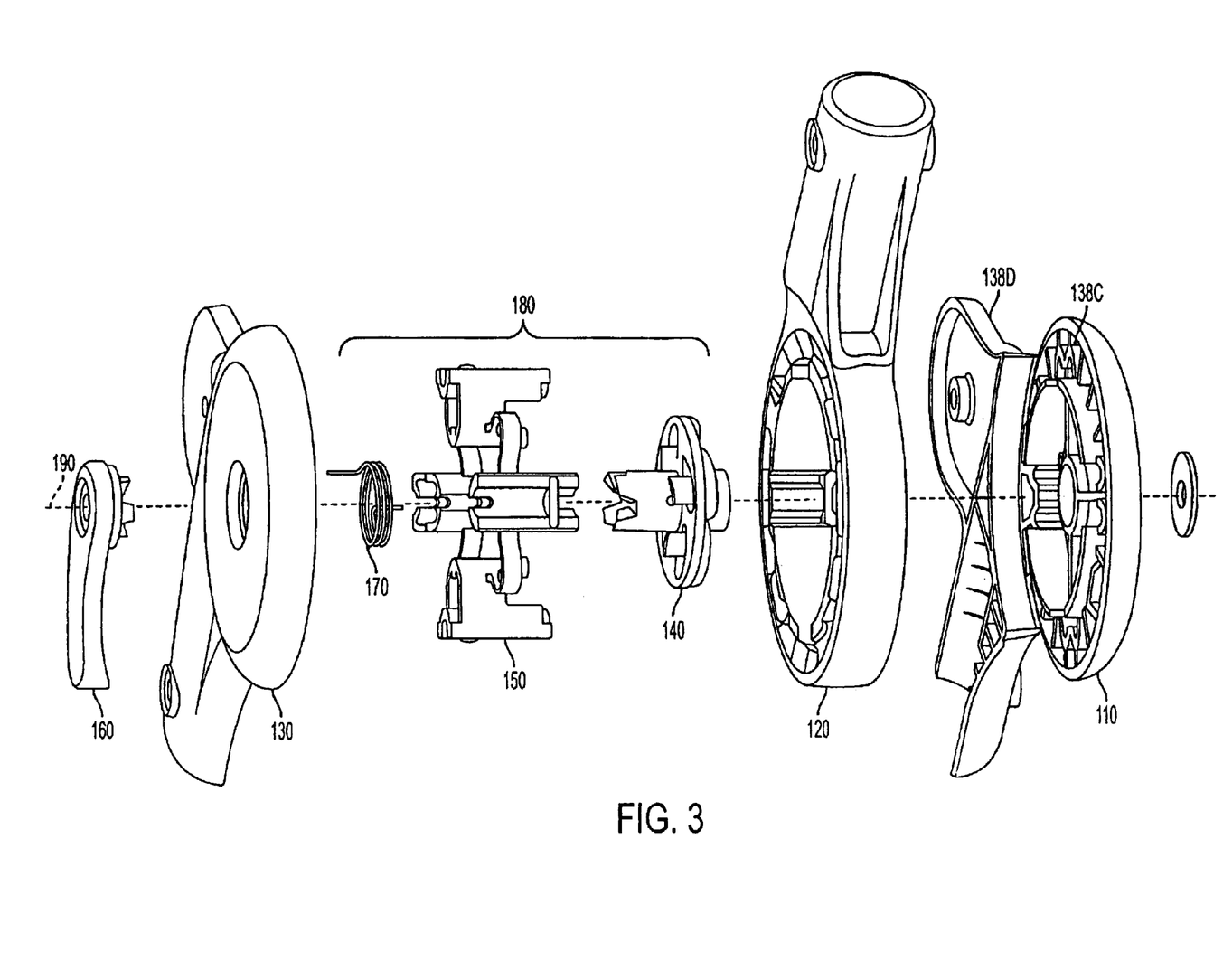
FIG. 3 is an exploded view of the lockable hinge.

FIGS. 3–7 provide various views of the internal structure of the hinge shells 110, 120, and 130 and lock assembly 180 of the lockable hinge 100. Turning specifically to FIG. 3, an exploded view of the lockable hinge 100 shows the hinge latch 160, the medial shell 130, the lock assembly 180, the center shell 120, and the lateral shell 110. The components of the lockable hinge 100 are moveably connected with an axle (not shown) at the pivot axis 190 of the lockable hinge 100, as well as by the fastening together of the lateral and medial shells 110 and 130.

The lock assembly 180 includes a torsion spring 170, a hinge lock 150, and an actuator 140. The outer shell of the lockable hinge 100 fully encases the lock assembly 180 providing a "pinch free" hinge. When the lock assembly 180 is in a locked position, the frame assembly 700 of the stroller 10 remains in a fixed position. As discussed earlier, the hinge latch 160 can be used to disengage the lock assembly 180 to allow the various parts of the frame assembly 700 to move relative to one another permitting the stroller 10 to collapse.

Figure 4:
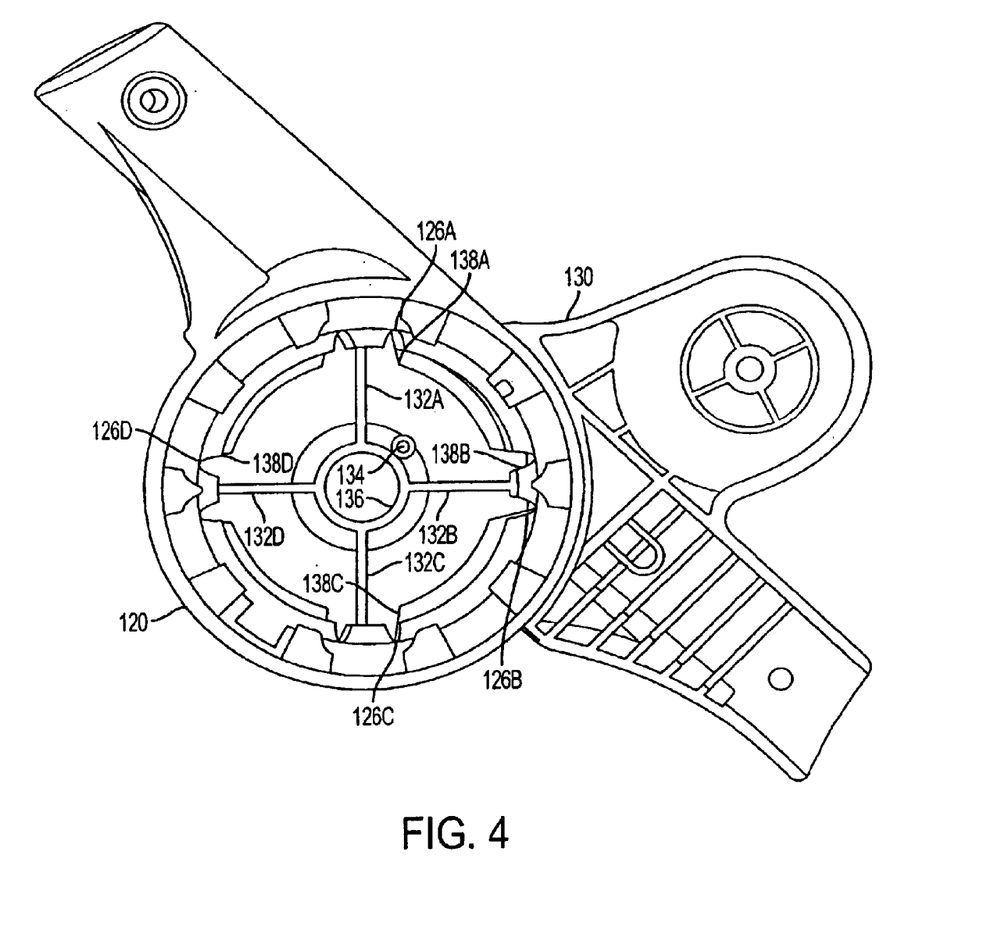
FIG. 4 is a diagrammatic view showing the inner surface of a lockable hinge shell.

FIG. 4 shows the inner surface of medial shell 130 and center shell 120. The medial shell 130, as well as the lateral shell 110 include a pivot opening 136, rails 132A–D, and lock recesses 138A–D. The rails 132A–D extend radially from the pivot opening 136 to the center of the lock recesses 138A–D. A spring retention hole 134 is located near the pivot opening 136 of the medial shell 110 providing a location to affix one end of the torsion spring 170.

The inner wall of the center shell 120 also includes lock recesses 126A–D. When the lockable hinge 100 is in a locked position, the center shell lock recesses 126A–D align with the medial and lateral shell lock recesses 138A–D (see also FIG. 3).

Figure 5:
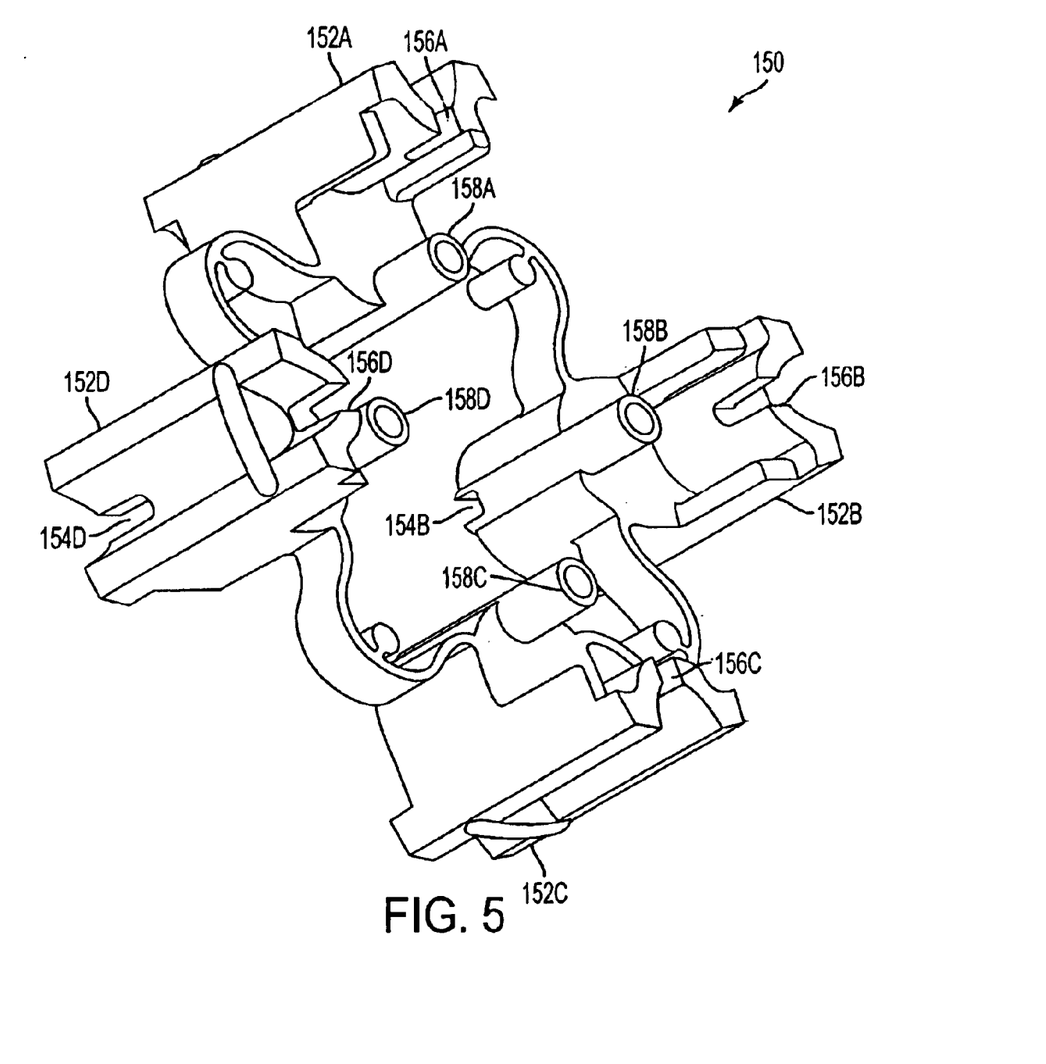
FIG. 5 is a perspective view of a hinge lock of the lockable hinge.

Turning to FIG. 5, the hinge lock 150 includes multiple tooth pairs 152A–D, grooves and 156A–D, and bosses 158A–D. The tooth pairs 152A–D are capable of radial movement relative to the pivot axis 190 of the lockable hinge. Grooves are located on the medial side 154B and 154D (154A and 154C are not visible) and lateral side 156A–D of each tooth pair. The tooth pair grooves 154A–D and 156A–D ride on the rails 132A–D of the lateral and medial shells 110 and 130, providing controlled radial movement as the hinge lock 150 expands and contracts.

Bosses 158A–D, or posts, are also located on each tooth pair 152A–D. The bosses 158A–D provide contact points for engagement with the actuator 140. It should be appreciated that the number of teeth and toothed combinations, grooves, and bosses can be modified or altered as necessary and may vary from that shown.

Figure 6:
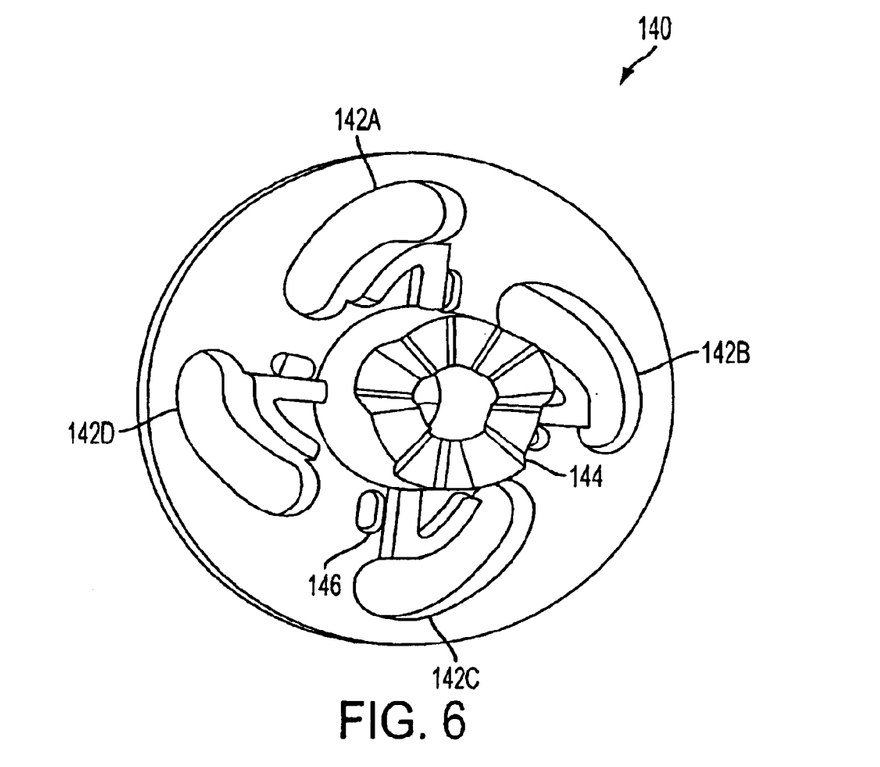
FIG. 6 is a perspective view of an actuator of the lockable hinge.

FIG. 6 shows the actuator 140 of the lockable hinge 100. The actuator 140 includes radial slots 142A–D, a hinge latch engagement surface 144, and a torsion spring opening 146. The radial slots 142A–D provide for interconnection with the bosses 158A–D of the hinge lock 150. The latch engagement surface 144 includes a multi-toothed surface for interconnecting with the hinge latch 160 in a manner that allows the movement of the hinge latch 160 to be translated to the actuator 140.

The torsion spring 170 is connected between the actuator 140 and the medial shell 110. The torsion spring 170 biases the actuator 140 to a locked position, and thus, the tooth pairs 152A–D to snap into place when the stroller is expanded for use. The outward biasing also provides for an extremely secure connection when the hinge 100 is locked. In a locked position, the tooth pairs 152A–D are continually forced into the recesses 126A–D and 138A–D of the outer shells, removing any unnecessary space, or "slop," providing an extremely secure connection between the top and bottom tubes.

Figure 7:
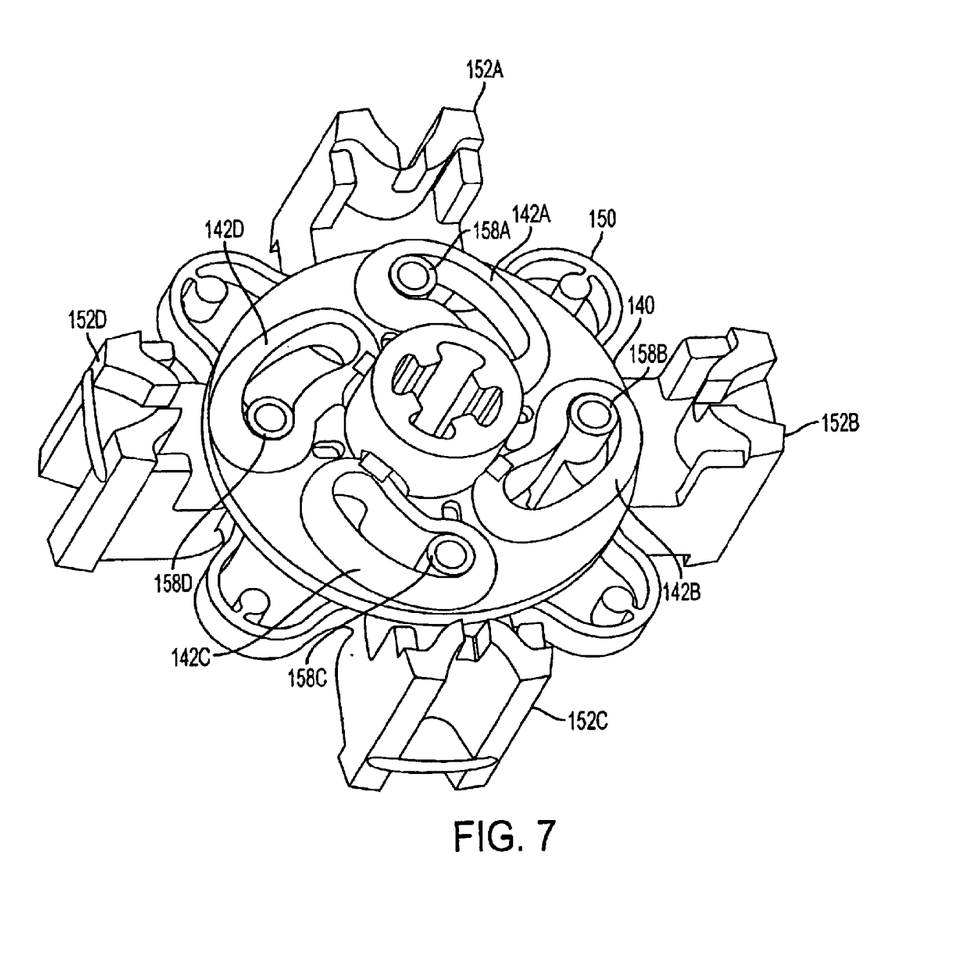
FIG. 7 is a view of the hinge lock interconnected with the actuator.

FIG. 7 shows the hinge lock 150 and the actuator 140. In a locked position, the tooth pairs 152A–D fit into locking recesses 126A–D and 138A–D formed on the inner surface of the hinge shell. Movement of the hinge latch 160 creates a rotation of the actuator 140. As the actuator twists, the bosses 158A–D of the hinge lock 150 move inside the radial slots 142A–D of the actuator 140. The radial slots 142A–D are positioned in such a manner that this rotation moves the bosses 158A–D radially inward, retracting the tooth pairs 152A–D from the locking recesses 126A–D and 138A–D of the hinge shell. Once the tooth pairs 152A–D are retracted, the hinge is free to move about its pivot axis 190, allowing the frame assembly 700 to move and the stroller 10 to collapse.

The embodiment of the stroller 10 shown in FIG. 1 also includes a seat assembly 800. The seat assembly 800 pivots in a manner that allows the seat to strike the hinge latch 160 of the lockable hinge 100 unlocking the hinge. Further embodiments of the stroller 10 include a seat latch assembly 200 to secure the seat assembly 800 in a fixed position while the stroller 10 is in use. FIGS. 8–13 show various embodiments and components of the seat assembly 800 and seat latch assembly 200.

Figure 8:
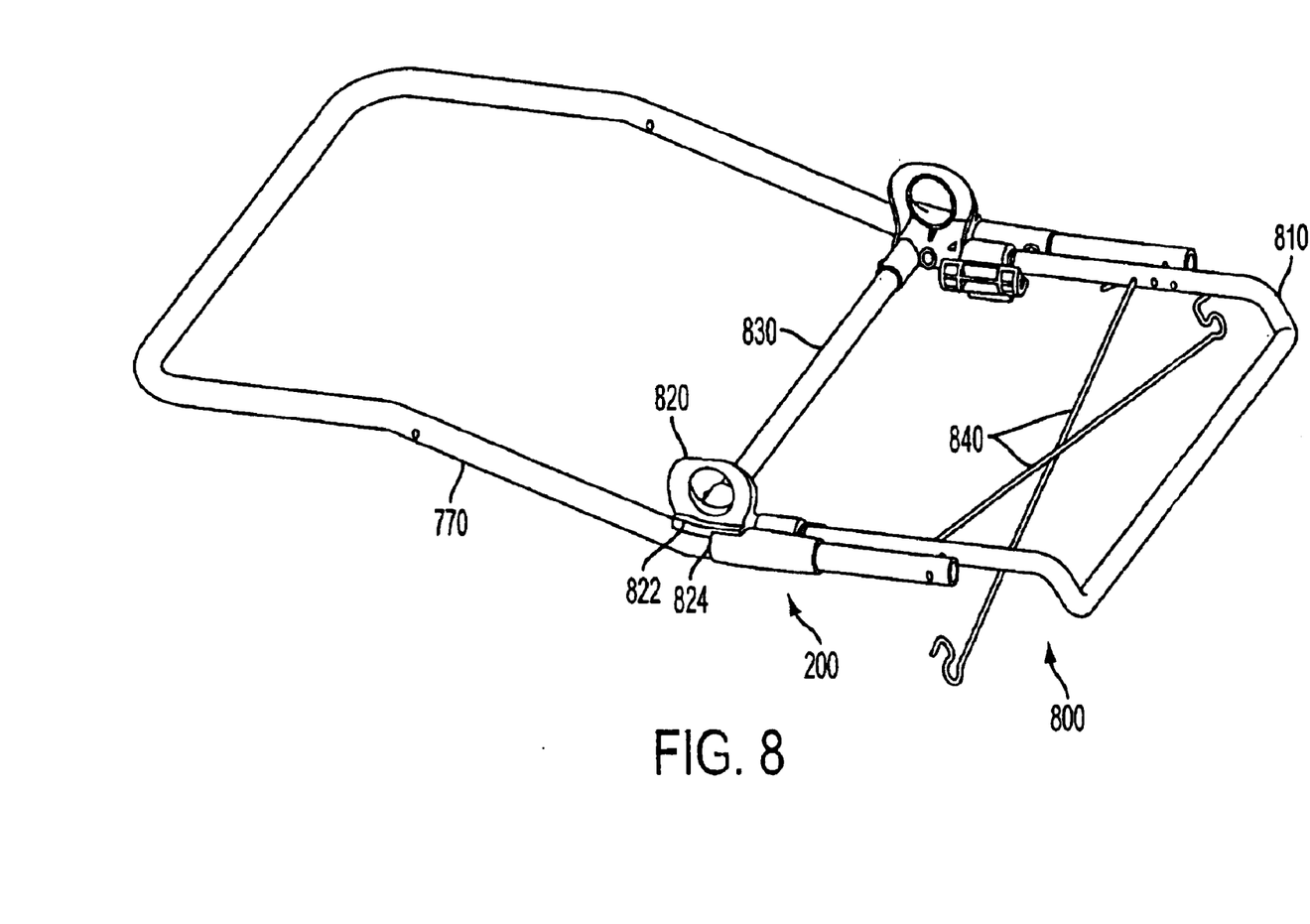
FIG. 8 is a perspective view of a seat frame assembly in accordance with an embodiment of the present invention.

FIG. 8 shows an embodiment of the seat assembly 800. The seat assembly 800 includes a front U-tube 810, rear corners 820, a rear tube 830, torsion springs 840, and seat and back surfaces (not shown), such as fabric and/or corrugated board. The seat assembly 800 is pivotally attached to the basket frame 770. The torsion springs 840 bias the seat assembly 800 in a downward position.

The rear corners 820 include a ramped engagement surface 822 and a seat stop 824. The ramped engagement surface 822 is used to engage with the hinge latch 160 of the lockable hinge 100. The seat stop 824 stops the downward rotation of the seat assembly 800 and rests on the basket frame 770 while the stroller 10 is in use.

The seat latch assembly 200 selectively secures the seat frame assembly 800 relative to the frame assembly 700, and specifically to the basket frame 770. In one embodiment a strap (not shown) is affixed to components of the seat latch assembly 200. In use, the strap (not shown) may be pulled with one hand to unlock the seat latch assembly 200 and raise the rear of the seat assembly 800. Engagement surfaces 822 on the rear corners 820 come into contact with the hinge latches 160 unlocking the lockable hinges 100.

Figure 9:
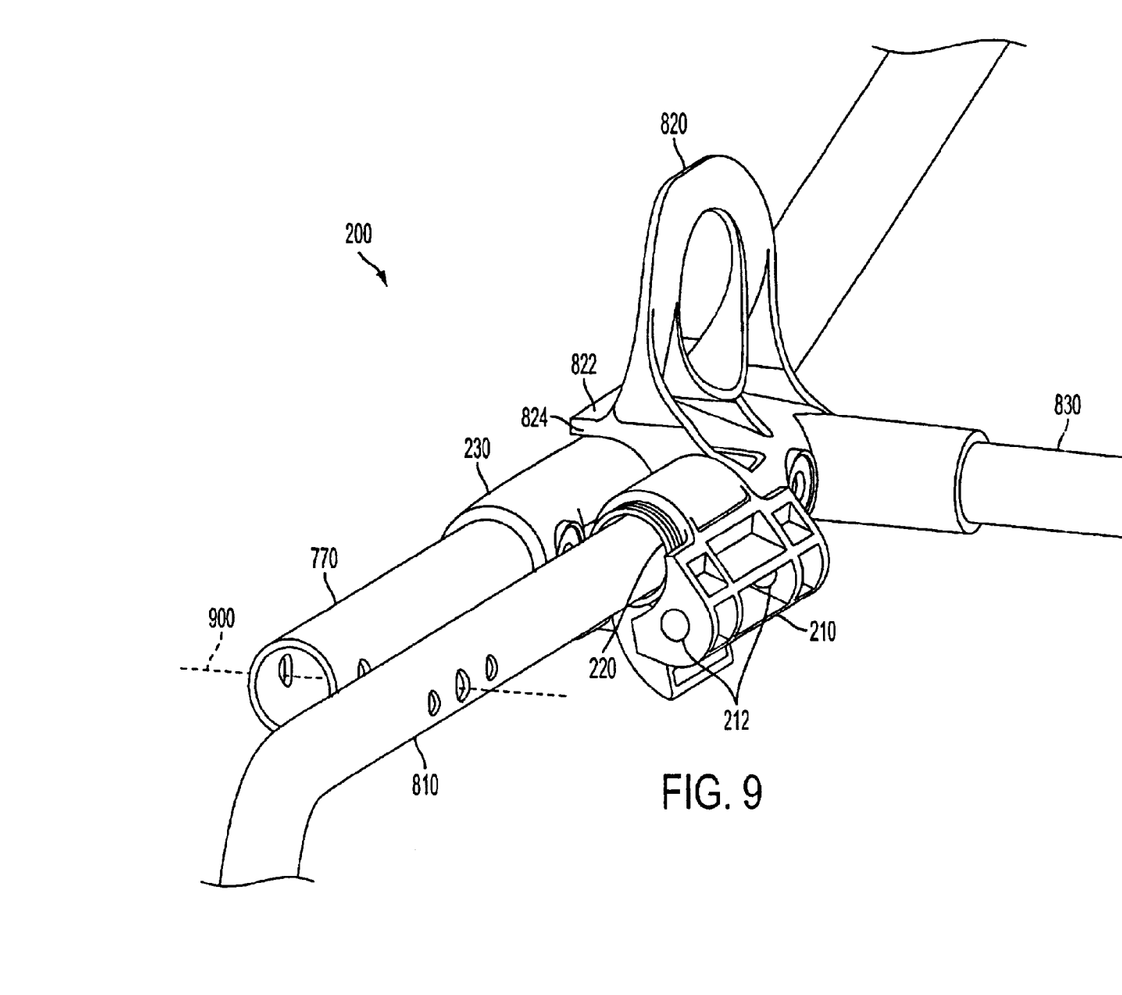
FIG. 9 is an enlarged view of the seat latch assembly according to an embodiment of the present invention.

FIGS. 9–12 show detailed view of one embodiment of the seat latch assembly 200. Turning specifically to FIG. 9, the seat latch assembly 200 includes a seat latch 210, a biasing spring 220, and a frame latch 230. The seat latch 210 is pivotally mounted on the front embodiment, a strap (not shown) is attached to the seat latch via an attachment post (not shown) located between the post openings 212 of the seat latch 210. The frame latch 230 is fixedly attached to the basket frame 770. When the seat latch assembly 200 is in an unlocked position the seat assembly 800 rotates about pivot axis 900.

Figure 10:
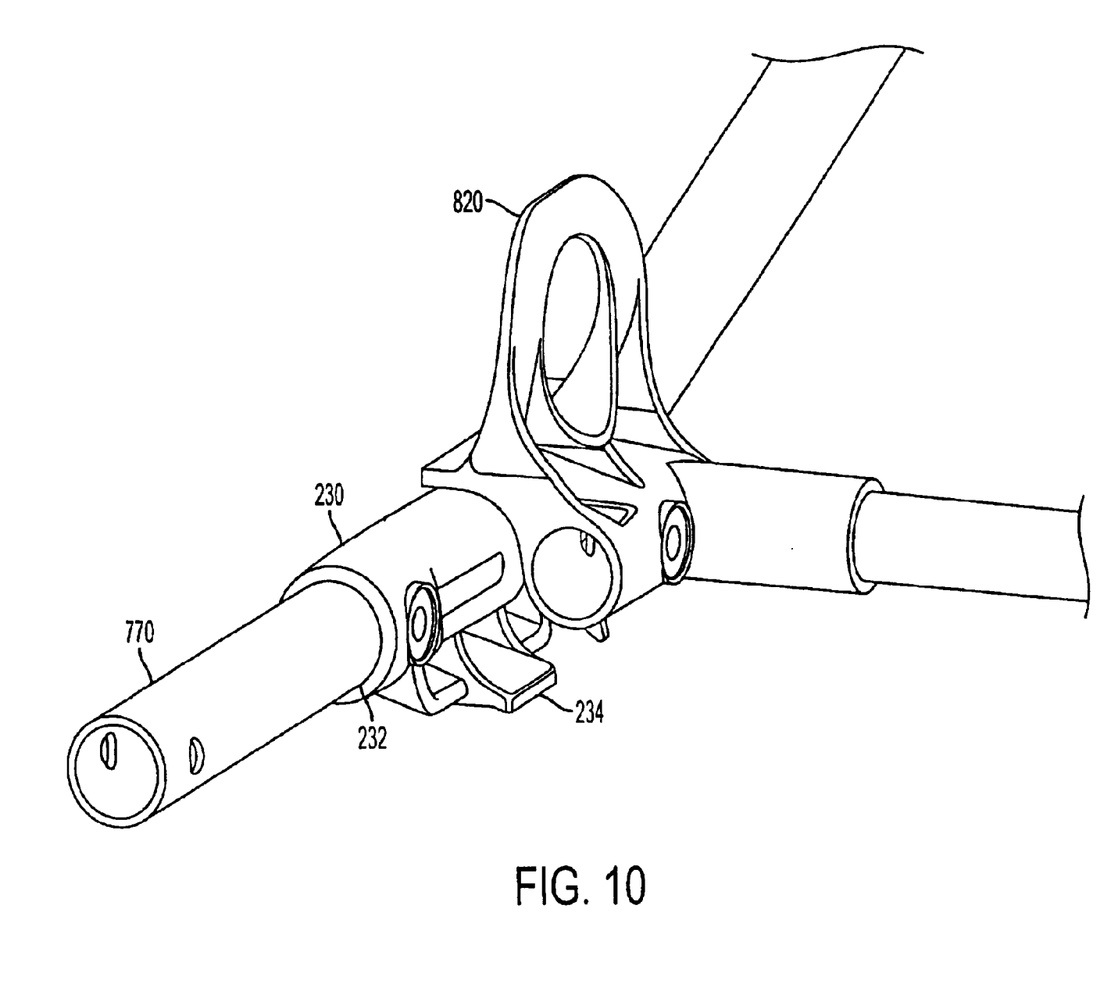
FIG. 10 is a perspective view showing the frame latch of the seat latch assembly.

FIG. 10 shows a detailed view of the frame latch 230 of the seat latch assembly 200. The frame latch 230 includes an opening 232 for attaching the frame latch 230 to the basket frame 770, and a latching tongue 234. In a locked position, the seat latch 210 engages with the latching tongue 234 securing the seat frame assembly to the basket frame 770.

Figure 11:
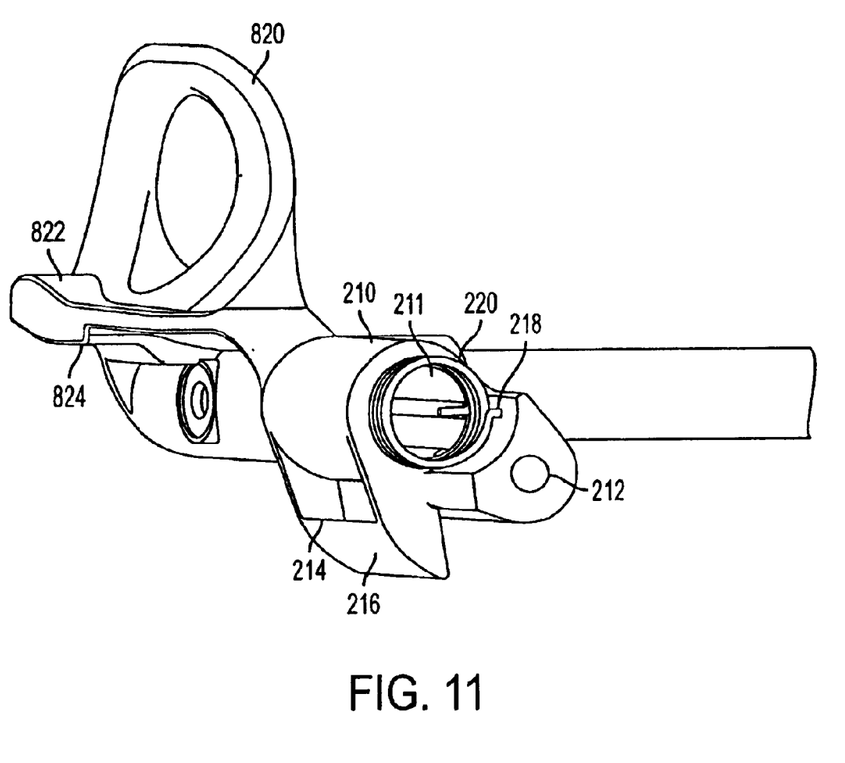
FIG. 11 is a perspective view of the rotating seat latch of the seat latch assembly.

FIG. 11 shows a detailed view of the seat latch 210. The seat latch 210 further includes an opening 211 for pivotally mounting the seat latch 210 to the front U-tube 810, a locking recess 214, a ramped surface 216, and a spring attachment opening 218. In a locked position, the locking recess 214 engages with the latching tongue 234 of the frame latch 230 preventing upward movement of the seat frame assembly 800.

One end of the biasing spring 220 is inserted into the spring attachment opening 218. The other end of the biasing spring 220 is inserted into an opening in the U-tube 810 of the seat frame assembly 800. The biasing spring 220 biases the seat latch 210 to a locked position.

Figure 12:
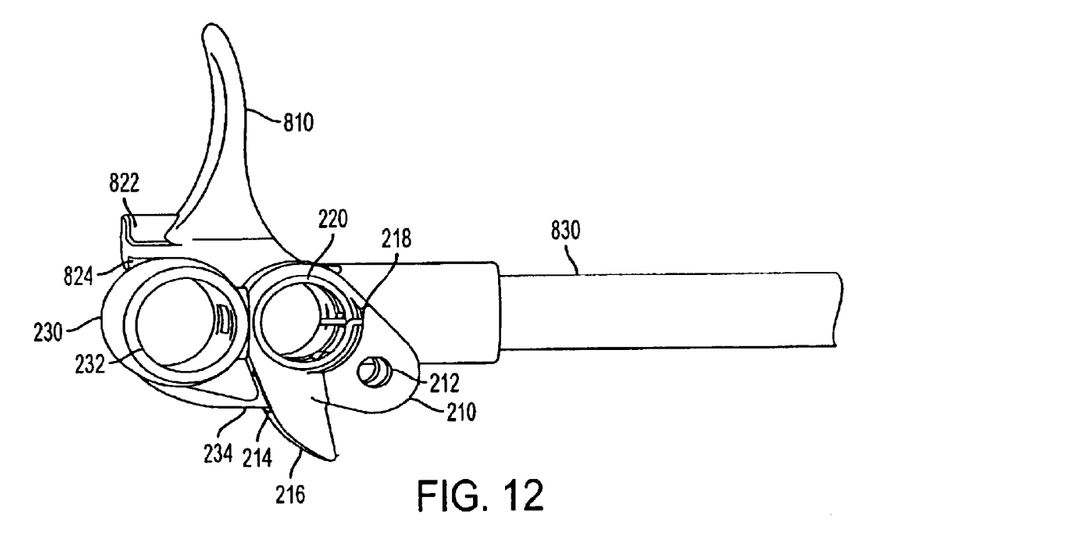
FIG. 12 is a planar view of the seat latch assembly.

FIG. 12 shows a detailed view of the seat latch assembly 200 in a locked position. In operation, the locking tongue 234 of the frame latch 230 engages with the locking recess 214 of the seat latch preventing upward movement of the seat assembly 800.

When collapse of the stroller 10 is desired, the seat latch is rotated away from the latching tongue 234, the seat latch 210 clears the latching tongue 234 allowing the seat latch 210 and rear end of the seat frame assembly 800 to rotate about the pivot access 900 away from the basket frame 770.

When transferring the stroller 10 from a collapsed position to an open position, the seat frame assembly 800 rotates downward toward a locked position. As the ramped surface 216 of the seat latch 210 comes in contact with the locking tongue 234 of the frame latch 230, the seat latch is rotated to allow the locking recess 214 of the seat latch to pass over the locking tongue 234 of the frame latch. Once the locking recess 214 is able to engage with the locking tongue 234, the torsion spring biases the seat latch to a locked position, locking the seat frame 800 in place.

Figure 13:
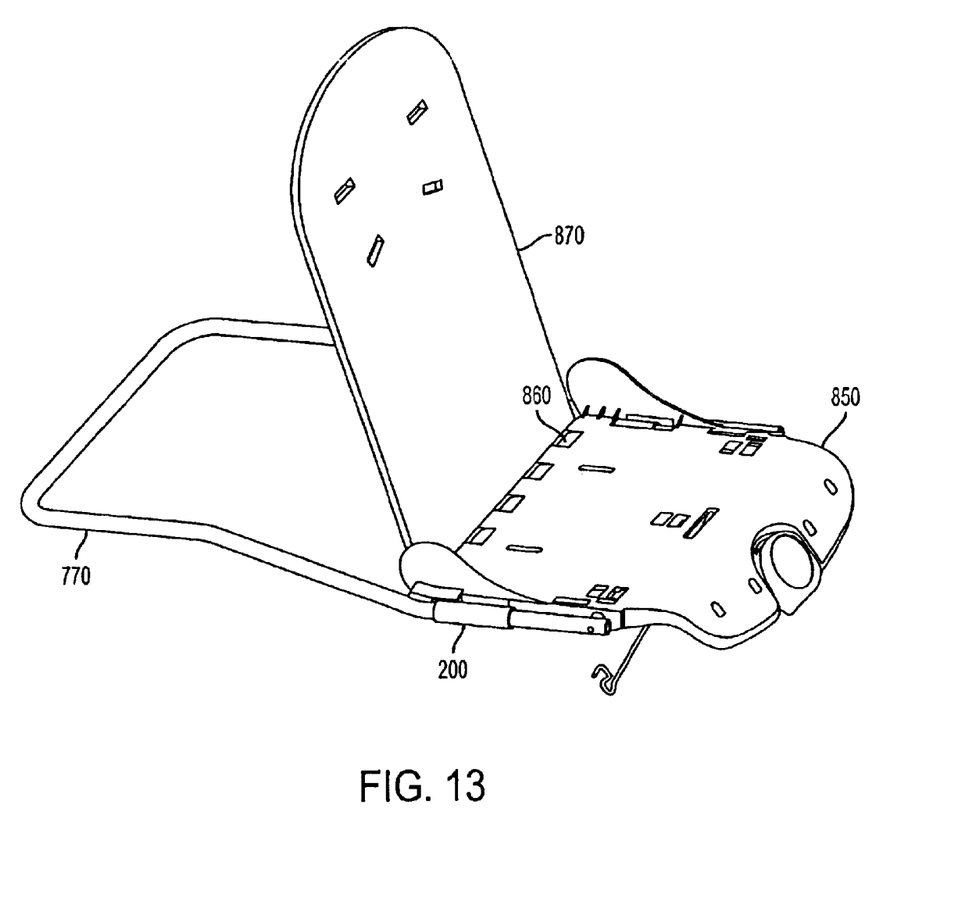
FIG. 13 is a perspective view of a further embodiment of the seat and seat frame assembly.

FIG. 13 shows an alternative embodiment of the seat, and seat frame assembly 800 in accordance with the present invention. The seat frame assembly 800 of this embodiment includes a molded seat 850, a rear U-tube 860, and a molded seat back 870. The rear U-tube 860 mounts to the underside of the molded seat 850 and extends across the rear of the seat and extending past the pivot axis of the seat assembly 800. The rear U-tube 860 provides support to the molded seat 850 and a strong pivot area.

The ramped surface 822 and seat stop 824 of the corner 820 of the previous embodiment are incorporated in the molded seat 850 of the present embodiment. A seat latch assembly 200 attaches and works in a similar manner as the embodiment shown in FIGS. 8–12.

Figure 14:
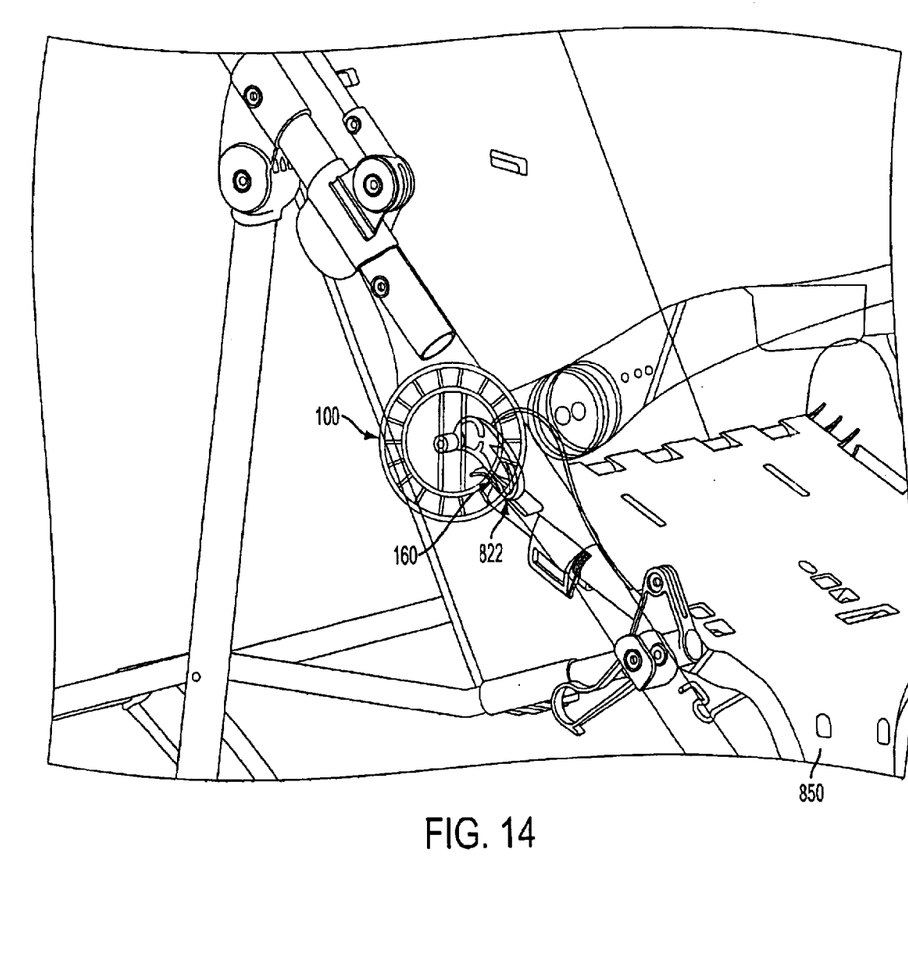
FIG. 14 is a diagrammatic view showing the engagement surface of the seat assembly engaging with the hinge latch of the lockable hinge in accordance with an embodiment of the present invention.

FIG. 14 shows the molded seat 850 in a tilted position. In the tilted position the engagement surface 822 engages with the hinge latch 160. The upward motion of the seat 850 will unlock the lockable hinge 100 allowing the stroller to collapse.

While the present invention has been illustrated in detail and with reference to specific embodiments thereof, it will be apparent to one skilled in the art that various changes and modifications can be made therein without departing from the spirit and scope thereof. Thus, it is intended that the present invention covers the modifications and variations of these inventions as would be apparent to those skilled in the art.

What is claimed is:

1. A collapsible stroller, comprising:
   a frame assembly;
   at least one lockable hinge interconnected with the frame assembly and capable of a locked and an unlocked position, wherein in the locked position the at least one lockable hinge maintains the frame assembly in a fixed position, and in the unlocked position allows the frame assembly to move between the fixed position and a collapsed position;
   a seat assembly pivotally connected to the frame assembly and capable of engaging and unlocking the at least one lockable hinge.

2. The stroller of claim 1, further comprising a seat latch assembly connected to the frame assembly and the seat assembly for selectively securing the seat assembly to the frame assembly.

3. The stroller of claim 2, wherein the seat latch assembly further comprises:
   a frame latch mounted on the stroller frame;
   a seat latch pivotally mounted on the seat assembly for selective engagement with the frame latch; and
   a torsion spring interconnected with the seat latch and the seat frame assembly biasing the seat latch to an engaged position.

4. The stroller of claim 1, wherein the at least one lockable hinge further comprises:
   a multiple part outer shell capable of pivotal movement about a rotation axis;
   a hinge lock disposed within the outer shell for locking the outer shell in a fixed position;
   an actuator disposed within the outer shell and interconnected with the hinge lock for moving the lock between a locked and unlocked position; and
   a hinge latch interconnected with the actuator for translating movement of the latch to the actuator.

5. The stroller of claim 4, wherein the multiple part outer shell comprises
   a medial shell;
   a center shell; and
   a lateral shell.

6. The stroller of claim 1, wherein the seat assembly further comprises:
   a pair of rear latch corners having latch engagement surfaces;
   a rear tube; and
   a front U-tube.

7. The stroller of claim 1, wherein the seat assembly further comprises:
   a molded seat having integrated latch engagement surfaces; and
   a rear U-tube.

8. The stroller of claim 1, further comprising a multi-part front wheel assembly including a swivel lock capable of selectively locking the front wheel assembly in a selected position.

9. The stroller of claim 1, further comprising a split-board basket base having a split along the median of the basket base.

10. A collapsible stroller, comprising:
    a stroller frame;
    at least one lockable hinge interconnected with the stroller frame, that remains in a fixed position when locked and moves about a pivot axis when in an unlocked position, including:
    a multi-part outer shell,
    a hinge lock disposed within the outer shell for selectively locking the outer shell in a fixed position,
    an actuator disposed within the outer shell and interconnected with the hinge lock, wherein rotation of the actuator moves the lock between locked and unlocked positions, and wherein the hinge lock has radially retractable teeth that engage the multi-part outer shell.

11. The collapsible stroller of claim 10, further comprising a hinge latch interconnected with the actuator for translating movement of the latch to the actuator.

12. A lockable hinge that pivots about a pivot axis in an unlocked position and that remains fixed when in a locked position, comprising:
    a multi-part outer shell;
    a hinge lock disposed within the outer shell for selectively locking the outer shell in a fixed position,
    an actuator disposed within the outer shell and interconnected with the hinge lock, wherein rotation of the actuator moves the lock between locked and unlocked positions, and wherein the hinge lock has radially retractable teeth that engage the multi-part outer shell.

13. The lockable hinge of claim 12, further comprising a hinge latch located on the outer shell and interconnected with the actuator for translating movement, of the latch to the actuator.

* * * * *